US011520904B2

(12) United States Patent
Sanghvi et al.

(10) Patent No.: US 11,520,904 B2
(45) Date of Patent: Dec. 6, 2022

(54) AI-BASED BLOCKCHAIN HYBRID CONSENSUS (71) Applicant: Accenture Global Solutions Limited, Dublin (IE)

(72) Inventors: Prashant Sanghvi, Gurgaon (IN); Asmita Bhattacharya, Gurgaon (IN); Pravesh Kumar, New Delhi (IN); Avishek Saha, New Delhi (IN); Piyush Manocha, New Delhi (IN); Rakesh Sharma, Delhi (IN)

(73) Assignee: Accenture Global Solutions Limited, Dublin (IE)

( * ) Notice: Subject to any disclaimer, the term of this patent is extended or adjusted under 35 U.S.C. 154(b) by 649 days.

(21) Appl. No.: 16/551,839

(22) Filed: Aug. 27, 2019

(65) Prior Publication Data

US 2021/0064763 A1 Mar. 4, 2021

(51) Int. Cl.
*G06F 21/60* (2013.01)
*G06N 20/00* (2019.01)

(52) U.S. Cl.
CPC .............. *G06F 21/60* (2013.01); *G06N 20/00* (2019.01)

(58) Field of Classification Search
CPC ........ G06F 21/60; G06F 16/182; G06N 20/00
See application file for complete search history.

(56) References Cited

U.S. PATENT DOCUMENTS

| | | | | |
|---|---|---|---|---|
| 5,917,840 A * | 6/1999 | Cheney | ................. | H04L 1/0086 714/758 |
| 10,592,783 B2 * | 3/2020 | Zheng | ................. | G06K 9/6277 |
| 10,841,372 B1 * | 11/2020 | Ram | ...................... | H04L 65/80 |
| 10,862,959 B2 * | 12/2020 | Finlow-Bates | ....... | H04L 67/104 |
| 11,128,603 B2 * | 9/2021 | Karame | .............. | G06Q 20/405 |
| 2007/0198697 A1 * | 8/2007 | Abernethy, Jr. | .......... | G06F 8/72 709/224 |
| 2017/0206238 A1 * | 7/2017 | Coutinho | ................ | H04W 4/70 |
| 2017/0300911 A1 * | 10/2017 | Alnajem | ............ | G06Q 20/4015 |
| 2018/0109541 A1 * | 4/2018 | Gleichauf | ............. | H04W 12/06 |

(Continued)

FOREIGN PATENT DOCUMENTS

| | | | | |
|---|---|---|---|---|
| CN | 107864198 A | * | 3/2018 | .......... G06N 3/0454 |
| CN | 108230109 | | 6/2018 | |

(Continued)

OTHER PUBLICATIONS

EP Extended Search Report in European Appln. No. 20186163.0, dated Dec. 23, 2020, 9 pages.

*Primary Examiner* — Khoi V Le

*Assistant Examiner* — Thomas A Carnes (74) *Attorney, Agent, or Firm* — Fish & Richardson P.C.

(57) ABSTRACT

Implementations include providing a security rating and a data criticality value of one or more transactions, the one or more transactions to be recorded to a blockchain, and the blockchain being of a blockchain network, selecting a consensus protocol, the consensus protocol selected from a set of consensus protocols, and the consensus protocol selected based on the security rating and the data criticality value, defining a set of consensus nodes, the set of consensus nodes including nodes from one of a super node pool and a weak node pool, and executing, by the set of consensus nodes, the consensus protocol to record the one or more transactions to the blockchain.

15 Claims, 5 Drawing Sheets

(56) References Cited

U.S. PATENT DOCUMENTS

| | | | |
|---|---|---|---|
| 2018/0357683 A1* | 12/2018 | Pickover | G06Q 30/0282 |
| 2019/0065733 A1* | 2/2019 | Forehand | G06F 21/445 |
| 2019/0182030 A1* | 6/2019 | Jo | H04L 9/0637 |
| 2019/0236598 A1* | 8/2019 | Padmanabhan | G06Q 20/0655 |
| 2019/0238316 A1* | 8/2019 | Padmanabhan | H04L 9/0637 |
| 2019/0327082 A1* | 10/2019 | Ow | H04L 63/1408 |
| 2019/0342143 A1* | 11/2019 | Lin | H04L 41/30 |
| 2019/0349733 A1* | 11/2019 | Nolan | H04L 41/0806 |
| 2020/0120084 A1* | 4/2020 | Cheng | H04L 9/3236 |
| 2020/0143262 A1* | 5/2020 | Khare | G10L 15/1815 |
| 2020/0265511 A1* | 8/2020 | Silveira | G06Q 20/3678 |
| 2020/0372154 A1* | 11/2020 | Bacher | H04L 41/147 |
| 2020/0396065 A1* | 12/2020 | Gutierrez-Sheris | H04L 9/088 |
| 2021/0014309 A1* | 1/2021 | Kim | G07C 5/008 |
| 2021/0167942 A1* | 6/2021 | Zhang | G06Q 20/223 |

FOREIGN PATENT DOCUMENTS

| | | | | |
|---|---|---|---|---|
| CN | 108230109 A | * | 6/2018 | |
| CN | 107864198 | | 8/2018 | |
| CN | 109697606 | | 4/2019 | |
| CN | 109697606 A | * | 4/2019 | G06Q 20/102 |
| JP | 2018109878 A | * | 7/2018 | G06F 9/4831 |
| TW | 202009810 A | * | 3/2020 | G06Q 30/0212 |

* cited by examiner

AI-BASED BLOCKCHAIN HYBRID CONSENSUS

BACKGROUND

Distributed ledger systems (DLSs) record transactions to an immutable ledger typically referred to as a blockchain. A blockchain includes a series of blocks, each of the blocks having transactions recorded therein. To record transactions into a block, a consensus protocol is executed by nodes (e.g., computing systems) participating in the DLS. However, execution of the consensus protocol consumes technical resources (e.g., computational power, memory, energy). Consequently, technically robust nodes may be required to participate in a DLS, which can be a barrier to adoption of DLSs.

SUMMARY

Implementations of the present disclosure are generally directed to ⊠ variable consensus protocols within a distributed ledger system (DLS). More particularly, implementations of the present disclosure are directed to a blockchain hybrid consensus platform that uses artificial intelligence (AI) to select one or more consensus protocols from a set of consensus protocols and to select nodes for recording a transaction to a blockchain.

In some implementations, actions include providing a security rating and a data criticality value of one or more transactions, the one or more transactions to be recorded to a blockchain, and the blockchain being of a blockchain network, selecting a consensus protocol, the consensus protocol selected from a set of consensus protocols, and the consensus protocol selected based on the security rating and the data criticality value, defining a set of consensus nodes, the set of consensus nodes including nodes from one of a super node pool and a weak node pool, and executing, by the set of consensus nodes, the consensus protocol to record the one or more transactions to the blockchain. Other implementations of this aspect include corresponding systems, apparatus, and computer programs, configured to perform the actions of the methods, encoded on computer storage devices.

These and other implementations can each optionally include one or more of the following features: actions further include providing a weight assigned to the consensus protocol, the consensus protocol being executed based on the weight; the weight defines a number of consensus nodes in the set of consensus nodes that have to validate the one or more transactions to record the one or more transactions to the blockchain; the set of consensus protocols includes two or more consensus protocols having different computational requirements; a super node includes greater computational resources than a weak node; the security rating and the data criticality value are provided as output of a machine learning (ML) model that receives input data representative of the one or more transactions as input; and the consensus protocol is selected by a machine learning (ML) model that receives the security rating and the data criticality as input.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to ⊠ variable consensus protocols within a distributed ledger system (DLS). More particularly, implementations of the present disclosure are directed to a blockchain hybrid consensus platform that uses artificial intelligence (AI) to select one or more consensus protocols from a set of consensus protocols and to select nodes for recording a transaction to a blockchain. As described in further detail herein, the AI-based blockchain consensus platform of the present disclosure determines a security and a criticality of a transaction and uses a hybrid consensus mechanism to select nodes from multiple types of nodes for consensus processing using a consensus protocol from a set of consensus protocols.

In some implementations, actions include providing a security rating and a data criticality value of one or more transactions, the one or more transactions to be recorded to a blockchain, and the blockchain being of a blockchain network, selecting a consensus protocol, the consensus protocol selected from a set of consensus protocols, and the consensus protocol selected based on the security rating and the data criticality value, defining a set of consensus nodes, the set of consensus nodes including nodes from one of a super node pool and a weak node pool, and executing, by the set of consensus nodes, the consensus protocol to record the one or more transactions to the blockchain.

To provide further context for implementations of the present disclosure, and as introduced above, distributed ledger systems (DLSs), which can also be referred to as consensus networks (e.g., made up of peer-to-peer nodes) and blockchain networks, enable participating entities to securely, and immutably conduct transactions, and store data. Although the term blockchain is generally associated with particular networks, and/or use cases (e.g., cryptocurrency transactions), blockchain is used herein to generally refer to a DLS without reference to any particular network and/or use case.

A blockchain can be described as a data structure that immutably records transactions. A blockchain includes two or more blocks, where each block (except an initial block) is linked to an immediately preceding block. Linking blocks is achieved using a cryptographic hash of the preceding block and storing the hash in the subsequent block. Each block also includes a timestamp, its own cryptographic hash, and one or more transactions. The transactions, which have already been verified by the nodes of the blockchain network, are hashed and encoded into a Merkle tree. A Merkle tree can be described as a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

As introduced above, a blockchain network can be provided as a public blockchain network, a private blockchain network, or a consortium blockchain network. Implementations of the present disclosure are described in further detail herein with reference to a consortium blockchain network. It is contemplated, however, that implementations of the present disclosure can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, an insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. Example consensus protocols include, without limitation, practical Byzantine fault tolerance (PBFT), proof-of-work (POW), proof-of-stake (POS), proof-of-importance (POI), proof-of-authority (POA), and any appropriate combination thereof. Different consensus protocols have different computing requirements. That is, some consensus protocols require a higher amount of computational power than other consensus protocols. For example, POS requires less computational power than POW, and PBFT requires less computational power than POS.

Implementations of the present disclosure are described in further detail herein in with reference to a consortium blockchain network. It is contemplated, however, that implementations of the present disclosure can be realized in any appropriate blockchain network.

Figure 1:
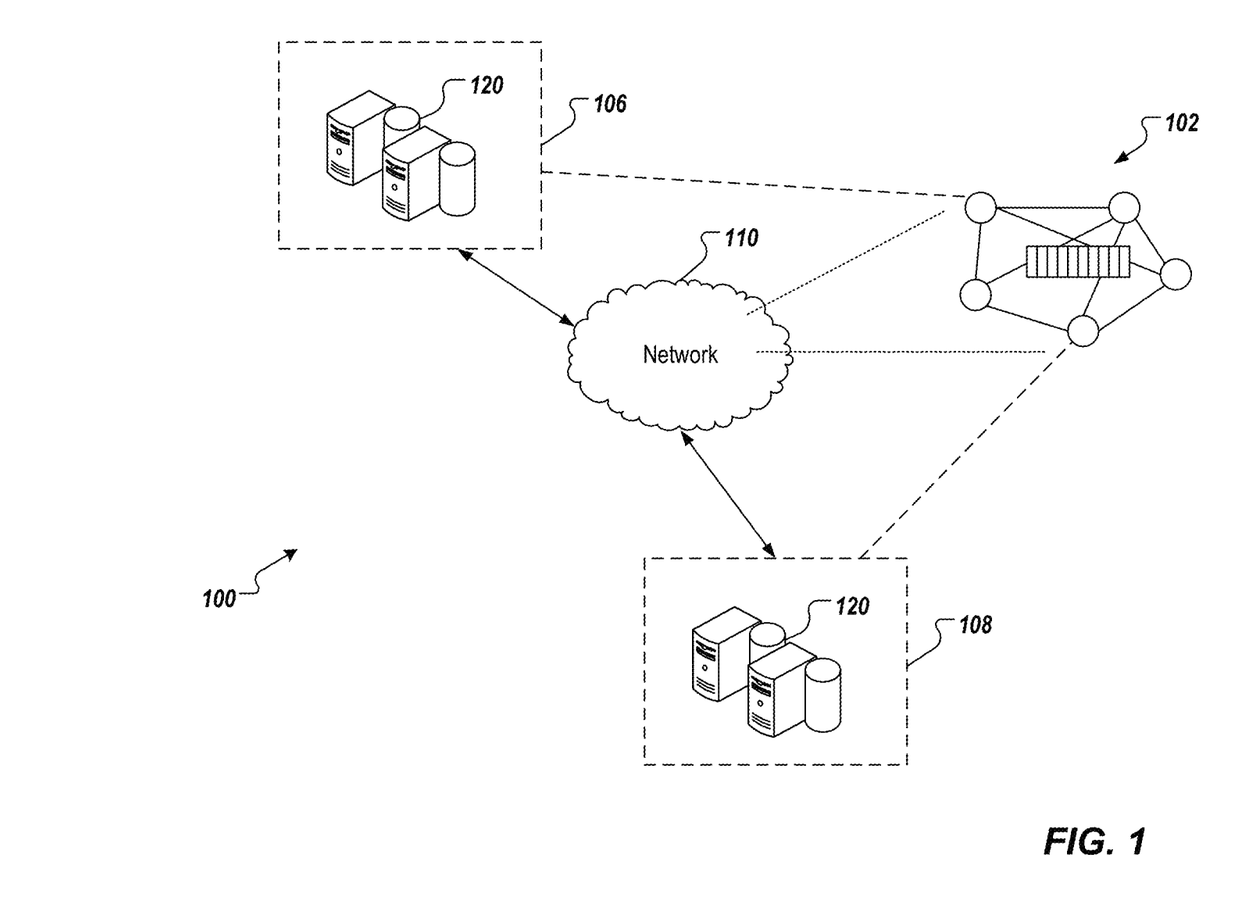
FIG. 1 depicts an example system that can execute implementations of the present disclosure.

FIG. 1 depicts an example environment 100 that can be used to execute implementations of the present disclosure. In some examples, the example environment 100 enables entities to participate in a consortium blockchain network 102. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general, the network 110 represents one or more communication networks. In some cases, the computing devices 106, 108 can be nodes of a cloud computing system (not shown), or can each computing device 106, 108 be a separate cloud computing system including a plurality of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., Participant A), such as transaction management system that the first entity uses to manage its transactions with one or more other entities (e.g., other participants). The computing system 108 can host computer-implemented services of a second entity (e.g., Participant B), such as transaction management system that the second entity uses to manage its transactions with one or more other entities (e.g., other participants). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
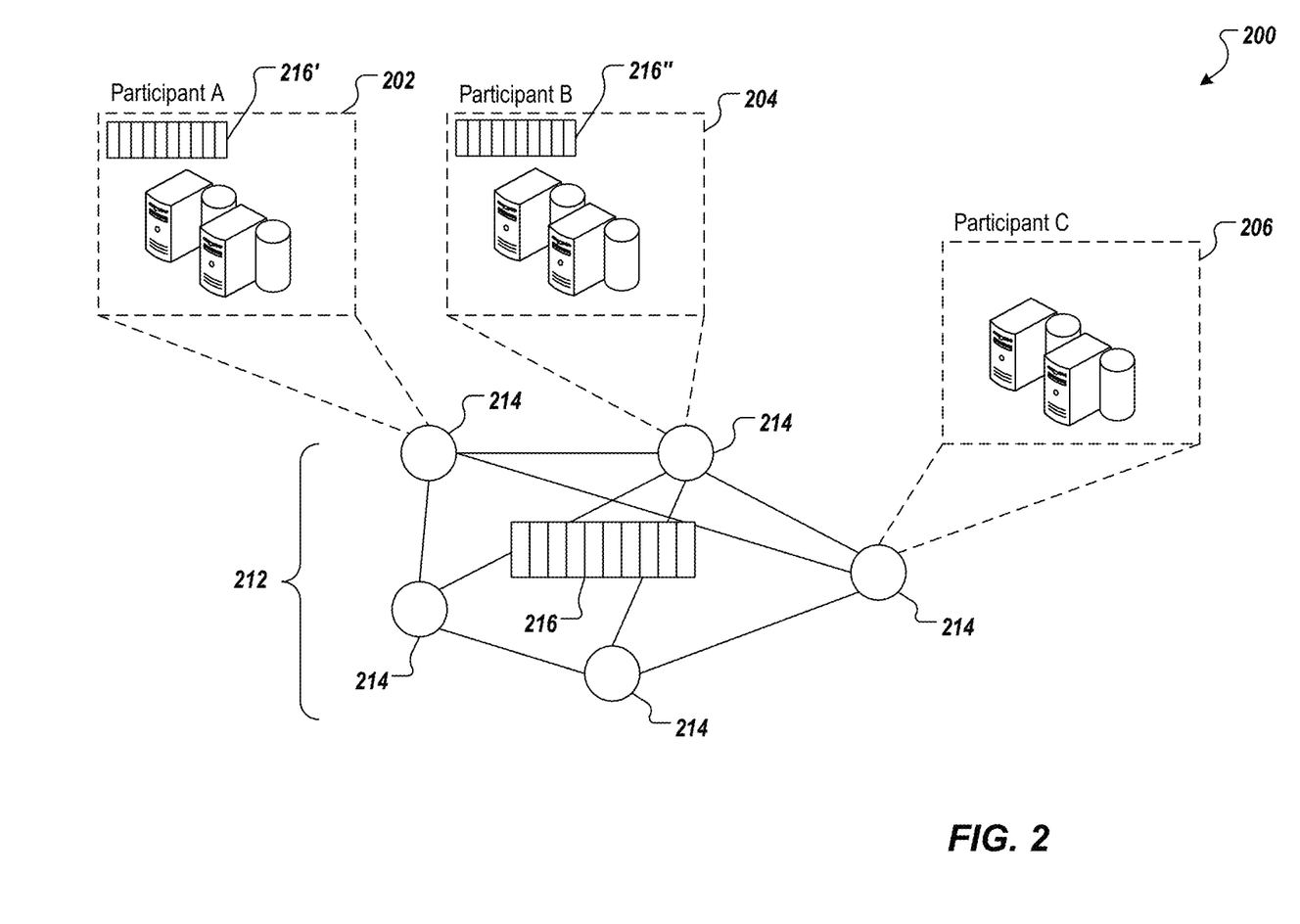
FIG. 2 depicts an example conceptual architecture in accordance with implementations of the present disclosure.

FIG. 2 depicts an example conceptual architecture 200 in accordance with implementations of the present disclosure. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212 and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of capability within the blockchain network 212. For example, some nodes 214 have robust technical resources (e.g., processing power, memory) and can participate in the consensus process and/or store a complete copy of the blockchain 216. Other nodes 214 have reduced technical resources and might not participate in the consensus process and/or might only store copies of portions of the blockchain 216.

In view of this, implementations of the present disclosure distinguish between so-called super nodes and weak nodes. In some implementations, a super node is a node that must definitely approve a block for appending to the blockchain based on a consensus protocol. That is, a super node always participates in the consensus process. In some implementations, a weak node is a node that sometimes participates in the consensus process. In some examples, and as described in further detail herein, a weak node is randomly selected from a set of nodes (i.e., a set of weak nodes) to approve a block for appending to the blockchain based on a consensus protocol. In some examples, weak nodes have less technical resources (e.g., computing power, memory) than super nodes. For example, a weak node may be a mobile device (e.g., smartphone, internet of things (IoT) sensor, laptop, embedded device, etc.) having less technical resources than a device serving as a super node.

A blockchain (e.g., the blockchain 216 of FIG. 2) is made up of a chain of blocks, each block storing data. An example of data includes transaction data representative of a transaction between two or more participants. While transactions are used herein by way of non-limiting example, it is contemplated that any appropriate data can be stored in a blockchain (e.g., documents, images, videos, audio). Examples of transactions can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol and perform work to have a block added to the blockchain. Such nodes are referred to as consensus nodes. PBFT, POW, POS, and POA, introduced above, are used as non-limiting examples of consensus protocols. The consensus nodes execute the consensus protocol to add transactions to the blockchain. As described in further detail herein, super nodes and weak nodes (randomly selected weak nodes) execute a selected consensus protocol to add transactions to the blockchain. That is, a set of consensus nodes includes a set of super nodes and a set of weak nodes.

In further detail, a consensus node generates a block header, hashes all of the transactions in the block, and combines the hash value in pairs to generate further hash values until a single hash value is provided for all transactions in the block (the Merkle root hash), and the hash is added to the block header. The consensus node also determines the hash value of the most recent block in the blockchain (i.e., the last block added to the blockchain). The consensus node also adds a nonce value, and a timestamp to the block header.

In some blockchain networks, cryptography is implemented to maintain privacy of transactions. For example, if two nodes want to keep a transaction private, such that other nodes in the blockchain network cannot discern details of the transaction, the nodes can encrypt the transaction data. Example cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message and sends the message with digital signature to Participant B. Participant B decrypts the digital signature using the public key of Participant A and extracts the hash. Participant B hashes the message and compares the hashes. If the hashes are same, Participant B can confirm that the message was indeed from Participant A and was not tampered with.

As introduced above, implementations of the present disclosure are directed to a blockchain hybrid consensus platform that uses artificial intelligence (AI) to select one or more consensus protocols from a set of consensus protocols and to select nodes for recording a transaction to a blockchain. As described in further detail herein, the AI-based blockchain consensus platform of the present disclosure determines a security and a criticality of a transaction and uses a hybrid consensus mechanism to select nodes from multiple types of nodes for consensus processing using a consensus protocol from a set of consensus protocols.

Implementations of the present disclosure are described in further detail herein with reference to an example use case. It is contemplated, however, that implementations of the present disclosure can be realized in any appropriate use case. The example use case includes a parts supply chain for aircraft parts. For example, stakeholders within a supply chain can participate in a consortium blockchain network that is used to record transactions along the supply chain (e.g., movement of parts through the supply chain). In some examples, the stakeholders can agree to different security and criticality of respective parts. For example, generic parts can be of less concern in terms of security and criticality, while non-generic parts (e.g., parts that incorporate proprietary technology) can be of more concern in terms of security and criticality. In some examples, for a given product, a bill of materials (BOM) can be provided and the stakeholders can agree to security and criticality of respective parts within the BOM.

In the example use case, a context can be defined, which indicates requirements of respective participants in the consortium blockchain network. For example, a participant can indicate that a particular part that moves along particular portions of the supply chain can be of more concern than a different part that moves along other portions of the supply chain. In this manner, stakeholders can restrict the scope of blockchain transactions to a particular critical plant or purchase category. Accordingly, and as described in further detail herein, implementations of the present disclosure enable stakeholders to implement the blockchain network across purchase categories as the energy requirement of node processing will be proportional to the transaction criticality.

To further illustrate implementations of the present disclosure, example parts can include engine, landing gear and seat upholstery. In an example supply chain, the engine can be sourced from the United Kingdom, the landing gear can be sourced from China, and the seat upholstery is sourced from India. The engine can be considered as a very critical component in the aircraft assembly. Consequently, and as described in further detail herein, the blockchain hybrid consensus platform assigns significant weightage to a more stringent consensus protocol in transactions involving engines. The landing gear can be considered as a critical component in the aircraft assembly and outsourcing of the landing gear poses risks. Consequently, and as described in further detail herein, the blockchain hybrid consensus platform assigns higher weightage to a stringent consensus protocol in transactions involving landing gear. In the example supply chain, the criticality and transaction value of transactions involving seat upholstery can be considered relatively low. Consequently, the blockchain hybrid consensus platform assigns greater weights to less stringent consensus protocols in transactions involving seat upholstery, which consensus protocols can be executed with lower burden on technical resources than more stringent consensus protocols.

Figure 3A:
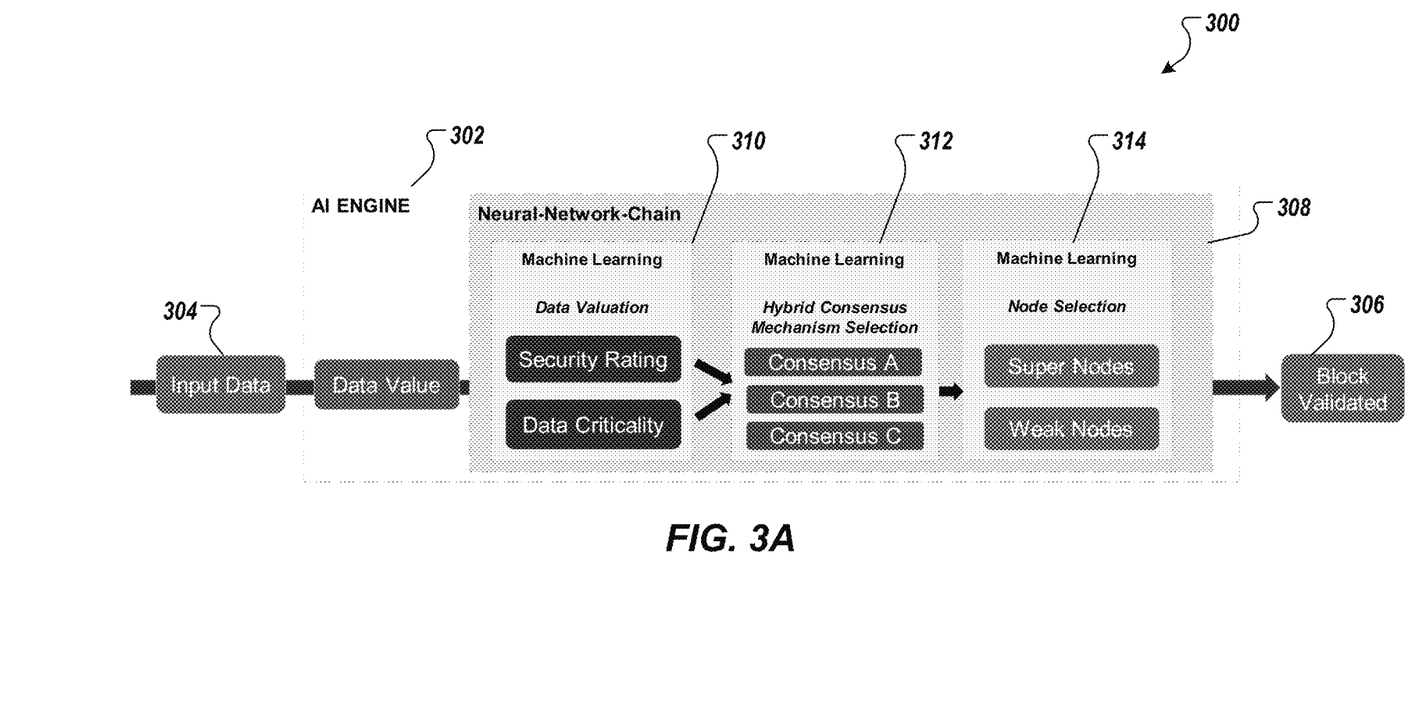
FIGS. 3A-3C depict a blockchain hybrid consensus platform in accordance with implementations of the present disclosure.
Figure 3B:
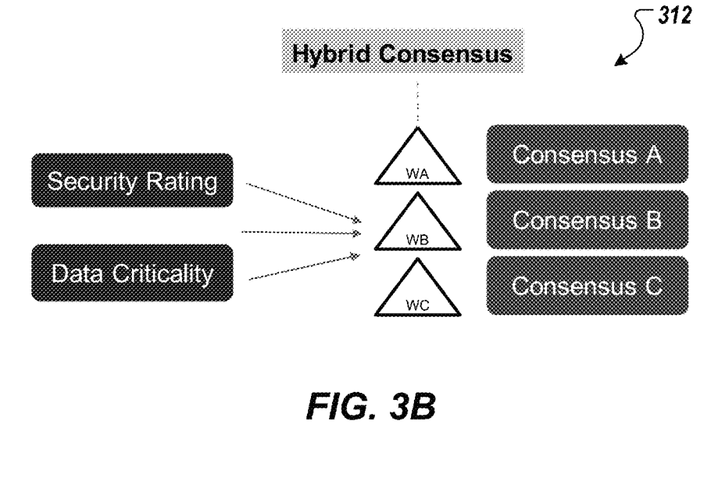
Figure 3C:
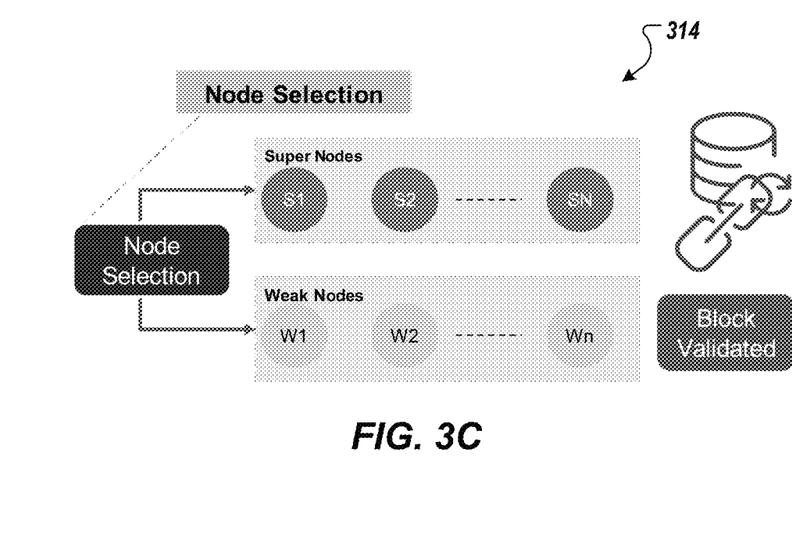

FIGS. 3A-3C depict a blockchain hybrid consensus platform 300 in accordance with implementations of the present disclosure. With particular reference to FIG. 3A, the blockchain hybrid consensus platform 300 includes an AI engine 302 that receives input data 304 and provides a validated block 306 for appending to a blockchain. In some examples, the input data 304 includes transaction data (e.g., data representative of one or more transactions that are to be recorded in a block of a blockchain). As described in further detail herein, the AI engine 302 determines a security rating of a transaction, assigns weights to consensus protocols in a set of consensus protocols, and, for each consensus protocol, selects a set of consensus nodes from a set of super nodes and a set of weak nodes for executing the consensus processing.

In general, the security rating accounts for a value and criticality of a block, and data criticality represents a relative importance of the data. In some examples, data criticality can be customized to particular requirements. For example, and considering seat upholstery, if sourced from India, the criticality and transaction value of the block would be low. Recording a block containing transaction data for seat upholstery can be quickly and resource-efficiently approved by assigning greater weightage to a different consensus mechanism, as described herein.

In some implementations, the AI engine 302 includes a neural network framework/chain 308 that includes a data valuation mechanism 310, a hybrid consensus mechanism 312, and a node selection mechanism 314. As described in further detail herein, the data valuation mechanism 310 receives a data value based on the input data 304 and determines a security rating and a criticality of the data value. In some examples, the data value represents a transactional value of a block that is to be appended to the blockchain. In some examples, the criticality represents a criticality of the data value as determined by the AI engine 302. In some examples, the security rating (e.g., on a scale of 1-100) is based on the block value and the block criticality. For example, the input data 304 is provided as a data structure representative of one or more transactions. In the example use case, the input data 304 includes a data structure that represents movement of a part along a supply chain and can include one or more parameters representative thereof. Example parameters can include, without limitation, transaction value, source country, source vendor, destination, and transit mode. In some examples, the parameters are customizable for respective contexts (e.g., respective participants in the consortium blockchain). In some implementations, the data structure can be processed to determine the data value from the input data 304.

In accordance with implementations of the present disclosure, the AI engine 302 uses the neural network framework 308 assess the security rating of a transaction value. In some examples, the security rating is based on one or more parameters that are representative of one or more transactions (example parameters are provided above). The AI engine 302 uses a combination of algorithms to determine the security rating. Example algorithms include, without limitation, generalized linear models (LM), k-nearest neighbors (KNN), support vector machines (SVM), and random forests.

In some implementations, the data valuation mechanism 310 processes the data value, and one or more parameters associated therewith, through a machine learning (ML) model to provide the security rating and the data criticality. For example, the ML model receives the data value, and one or more parameters associated therewith, as input and provides the security rating and the data criticality as output.

In some implementations, the hybrid consensus mechanism 312 determines a consensus protocol that is to be used to append the block to the blockchain. The hybrid consensus mechanism selects the consensus protocol from a set of consensus protocols. As depicted in FIG. 3B, and as described in further detail herein, a weight is assigned to each consensus protocol of the set of consensus protocols (e.g., WA, WB, WC of consensus protocols A, B, C, respectively). In some implementations, the weights are determined based on the security rating and the data criticality. In some examples, the consensus protocol is provided to balance ease of computation and security. In some examples, the consensus protocol is determined based on respective contexts. For example, a first participant in a consortium blockchain network can have high security requirements regardless of computing resources required, while a second participant in the consortium blockchain network can have lower security requirements to enable reduced burden on technical resources.

In some implementations, each weight represents a threshold number of nodes that have to approve the transactions for adding to the blockchain. With reference to FIG. 3B, the following example weights can be provided: Consensus A—weight (WA)=0.75, Consensus B—weight (WB)=0.20, and Consensus C—weight (WC)=0.05. Accordingly, under Consensus A, the transaction is validated when 75% of the set of consensus nodes approve the transaction, under Consensus B, the transaction is validated when 20% of the set of consensus nodes approve the transaction, and under Consensus A, the transaction is validated when 5% of the set of consensus nodes approve the transaction.

In some implementations, the hybrid consensus mechanism 312 processes the security rating and the data criticality through a ML model to provide respective weights of the consensus protocols and to select a consensus protocol that is to be used. For example, the ML model receives the security rating and the data criticality as input and provides the weights and the selected consensus protocol as output. In some examples, input to the ML model can also include parameters associated with the transaction and/or a context. As described herein, the consensus protocol and weights can be selected based on the security rating and the data criticality, where a more secure consensus protocol is selected for transactions of higher security rating and the data criticality, while a less secure consensus protocol is selected for transactions of lower security rating and the data criticality.

In some implementations, and as depicted in FIG. 3C, the node selection mechanism 314 selects a set of consensus nodes for executing the consensus protocol. In accordance with implementations of the present disclosure, consensus nodes to be included in the set of consensus nodes are selected from respective node pools, which include a super node pool and a weak node pool. In some examples, consensus nodes are selected from a single pool. For example, it can be determined that super nodes are to execute the consensus protocol, because the consensus protocol requires higher computational power. As another example, it can be determined that weak nodes are to execute the consensus protocol, because the consensus protocol does not require higher computational power. In some implementations, the node selection mechanism 314 processes the selected consensus protocol through a ML model to provide the set of consensus nodes that is to be used. For example, the ML model receives the selected consensus protocol as input and provides the set of consensus nodes as output.

In some implementations, the selection of the nodes for each consensus protocol is probabilistic. That is, nodes to perform as consensus nodes are randomly selected. In some examples, node selection is executed on-the-fly as a function of the security rating of the transaction. In this manner, the process time and computing requirement are optimized. For example, for a transaction having a high security rating, a greater weight is assigned to Consensus A (higher security but requires more computational power), and lower weights assigned to Consensus B and/or Consensus C (both having lower security and requiring less computational power than Consensus A). In this example, the node selection ensures more super nodes are selected for executing Consensus A than are selected for executing either Consensus B and Consensus C to validate the transaction, thereby optimizing the process.

Figure 4:
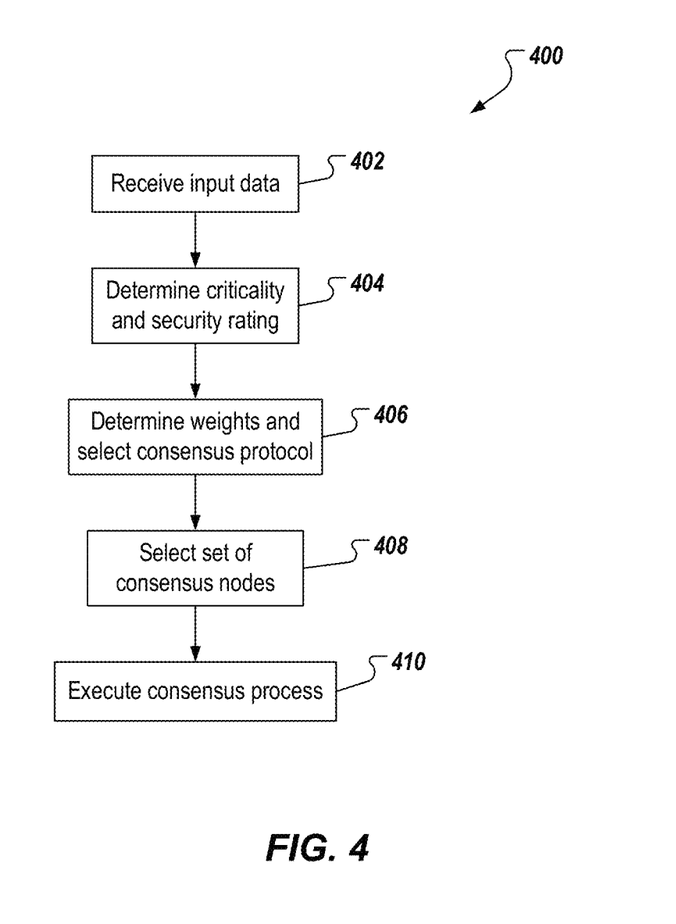
FIG. 4 depicts an example process that can be executed in implementations of the present disclosure.

FIG. 4 depicts an example process 400 that can be executed in implementations of the present disclosure. In some examples, the example process 400 is provided using one or more computer-executable programs executed by one or more computing devices (e.g., the back-end system 106 of FIG. 1).

Input data is received (402). For example, and with reference to FIG. 3A, the AI engine 302 that receives input data 304, which is representative of one or more transactions that are to be recorded to a blockchain within a blockchain network. In some examples, the input data 304 is provided as a data structure representative of one or more transactions (e.g., representing movement of a part along a supply chain and can include one or more parameters representative thereof).

A security rating and data criticality are determined (404). For example, the input data 304 is processed to determine the data value, and the data valuation mechanism 310 processes the data value, and one or more parameters associated therewith, through a ML model to provide the security rating and the data criticality. For example, the ML model receives the data value, and one or more parameters associated therewith, as input and provides the security rating and the data criticality as output. Weights are determined and a consensus protocol is selected (406). For example, the hybrid consensus mechanism 312 processes the security rating and the data criticality through a ML model to provide respective weights of the consensus protocols and to select a consensus protocol that is to be used.

A set of consensus nodes is selected (408). For example, the node selection mechanism 314 processes the selected consensus protocol through a ML model to provide the set of consensus nodes that is to be used. For example, the ML model receives the selected consensus protocol as input and provides the set of consensus nodes as output. In some examples, the set of consensus nodes includes super nodes. In some examples, the set of consensus nodes includes super nodes. The consensus process is executed (410). For example, each consensus node in the set of consensus nodes executes the selected consensus protocol. When at least subset of consensus nodes validates the transaction for inclusion in a block of the blockchain, the transaction is so included. The number of consensus nodes included in the subset of consensus nodes is determined based on the weight assigned to the selected consensus protocol. Continuing with the example above, if Consensus A with a weight of 0.75 is selected, the transaction is added to a block of the blockchain when 75% of the consensus nodes in the set of consensus nodes validate the transaction.

Implementations and all of the functional operations described in the present disclosure may be realized in digital electronic circuitry, or in computer software, firmware, or hardware, including the structures disclosed in the present disclosure and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple (CPU and/or GPU) processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the present disclosure may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While the present disclosure contains many specifics, these should not be construed as limitations on the scope of the disclosure or of what may be claimed, but rather as descriptions of features specific to particular implementations. Certain features that are described in the present disclosure in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for hybrid consensus in blockchain networks, the method being executed by one or more processors and comprising:
   providing a security rating and a data criticality value of one or more transactions, the one or more transactions to be recorded to a blockchain, and the blockchain being of a blockchain network;
   selecting a consensus protocol that has a weight corresponding to the security rating and the data criticality value of the one or more transactions, the weight of the consensus protocol representing a threshold number of nodes that have to approve the one or more transactions for recording the one or more transactions to the blockchain, the consensus protocol selected from a set of consensus protocols, and the consensus protocol selected by a machine learning (ML) model that receives the security rating and the data criticality value as input;
   selecting a set of consensus nodes according to a computation power required by the consensus protocol corresponding to the security rating and the data criticality value of the one or more transactions, the set of consensus nodes being selected from one of:
   a super node pool, or
   a weak node pool; and
   recording the one or more transactions to the blockchain in response to the set of consensus nodes executing the consensus protocol.

2. The method of claim 1, wherein the consensus protocol is executed based on the weight.

3. The method of claim 1, wherein the set of consensus protocols comprises two or more consensus protocols having different computational requirements.

4. The method of claim 1, wherein a super node comprises greater computational resources than a weak node.

5. The method of claim 1, wherein the security rating and the data criticality value are provided as output of a machine learning (ML) model that receives input data representative of the one or more transactions as input.

6. A non-transitory computer-readable storage medium coupled to one or more processors and having instructions stored thereon which, when executed by the one or more processors, cause the one or more processors to perform operations for hybrid consensus in blockchain networks, the operations comprising:
   providing a security rating and a data criticality value of one or more transactions, the one or more transactions to be recorded to a blockchain, and the blockchain being of a blockchain network;
   selecting a consensus protocol that has a weight corresponding to the security rating and the data criticality value of the one or more transactions, the weight of the consensus protocol representing a threshold number of nodes that have to approve the one or more transactions for recording the one or more transactions to the blockchain, the consensus protocol selected from a set of consensus protocols, and the consensus protocol selected by a machine learning (ML) model that receives the security rating and the data criticality value as input;
   selecting a set of consensus nodes according to a computation power required by the consensus protocol corresponding to the security rating and the data criticality value of the one or more transactions, the set of consensus nodes being selected from one of:
   a super node pool, or
   a weak node pool; and
   recording the one or more transactions to the blockchain in response to the set of consensus nodes executing the consensus protocol.

7. The computer-readable storage medium of claim 6, wherein the consensus protocol is executed based on the weight.

8. The computer-readable storage medium of claim 6, wherein the set of consensus protocols comprises two or more consensus protocols having different computational requirements.

9. The computer-readable storage medium of claim 6, wherein a super node comprises greater computational resources than a weak node.

10. The computer-readable storage medium of claim 6, wherein the security rating and the data criticality value are provided as output of a machine learning (ML) model that receives input data representative of the one or more transactions as input.

11. A system, comprising:
    one or more processors; and
    a computer-readable storage device coupled to the one or more processors and having instructions stored thereon which, when executed by the one or more processors, cause the one or more processors to perform operations for hybrid consensus in blockchain networks, the operations comprising:
    providing a security rating and a data criticality value of one or more transactions, the one or more transactions to be recorded to a blockchain, and the blockchain being of a blockchain network;
    selecting a consensus protocol that has a weight corresponding to the security rating and the data criticality value of the one or more transactions, the weight of the consensus protocol representing a threshold number of nodes that have to approve the one or more transactions for recording the one or more transactions to the blockchain, the consensus protocol selected from a set of consensus protocols, and the consensus protocol selected by a machine learning (ML) model that receives the security rating and the data criticality value as input;
    selecting a set of consensus nodes according to a computation power required by the consensus protocol corresponding to the security rating and the data criticality value of the one or more transactions, the set of consensus nodes being selected from one of:
    a super node pool, or
    a weak node pool; and
    recording the one or more transactions to the blockchain in response to the set of consensus nodes executing the consensus protocol.

12. The system of claim 11, wherein the consensus protocol is executed based on the weight.

13. The system of claim 11, wherein the set of consensus protocols comprises two or more consensus protocols having different computational requirements.

14. The system of claim 11, wherein a super node comprises greater computational resources than a weak node.

15. The system of claim 11, wherein the security rating and the data criticality value are provided as output of a machine learning (ML) model that receives input data representative of the one or more transactions as input.

\* \* \* \* \*